United States Patent
Yoshizawa

(10) Patent No.: US 7,512,611 B2
(45) Date of Patent: Mar. 31, 2009

(54) INFORMATION PROCESSING SYSTEM AND ELECTRONIC APPARATUS

(75) Inventor: Junichi Yoshizawa, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 301 days.

(21) Appl. No.: 11/476,883

(22) Filed: Jun. 29, 2006

(65) Prior Publication Data

US 2007/0005667 A1    Jan. 4, 2007

(30) Foreign Application Priority Data

Jun. 30, 2005    (JP)    ............................. 2005-192693

(51) Int. Cl.
*G06F 7/00* (2006.01)
*G06F 17/30* (2006.01)
*G06F 17/00* (2006.01)

(52) U.S. Cl. .......................... 707/100; 707/10; 707/102

(58) Field of Classification Search ............. 707/103 R, 707/203, 7, 10, 100, 101, 102, 200; 713/165; 382/100
See application file for complete search history.

(56) References Cited

U.S. PATENT DOCUMENTS

| | | | |
|---|---|---|---|
| 2002/0159594 A1* | 10/2002 | Kori | ........................... 380/203 |
| 2004/0111740 A1* | 6/2004 | Seok et al. | ..................... 725/31 |
| 2005/0091268 A1* | 4/2005 | Meyer et al. | ............ 707/103 R |

FOREIGN PATENT DOCUMENTS

| | | |
|---|---|---|
| JP | 2001-94552 | 4/2001 |
| JP | 2002-203070 | 7/2002 |
| JP | 2002-319227 | 10/2002 |
| JP | 2002-354386 | 12/2002 |

OTHER PUBLICATIONS

Qiong Liu, Reihaneh Safavi-Naini and Nocholas Paul Sheppard (2008), Digital Rights Management for Content Distribution, pp. 49-58.*

* cited by examiner

*Primary Examiner*—Don Wong
*Assistant Examiner*—Merilyn P Nguyen
(74) *Attorney, Agent, or Firm*—Finnegan, Henderson, Farabow, Garrett & Dunner, L.L.P.

(57) ABSTRACT

According to one embodiment, there is provided an electronic apparatus including a meta-data acquiring portion to acquire, through a network, meta-data containing, in a specific area, copy control information indicative of at least whether copy of a content is permitted or not, a meta-data analyzing portion to analyze information contained in the meta-data acquired by the meta-data acquiring portion, and an information display processing portion to display information indicative of a kind of a process that is permitted to be performed with respect to the content, based on the copy control information contained in the information analyzed by the meta-data analyzing portion, the specific area in the meta-data containing description of attribute information relating to a resource of the content, and the copy control information being described as a part of the attribute information.

8 Claims, 10 Drawing Sheets

```
<item id="root / video / publicVideo / B-V-MPEG_PS_NTSC-MPEG1L2-M1" parentID="root / video / publicVideo /" restricted="1">
  <dc:title>B-V-MPEG_PS_NTSC-MPEG1L2-M1</ dc:title>
  <upnp:class>object.item.videoItem</ upnp:class>
  <dc:creator>Video Creator</ dc:creator>
  <dc:date>2004-06-15</ dc:date>
  <upnp:writeStatus>NOT_WRITABLE</ upnp:writeStatus>
  <upnp:storageMedium>HDD</ upnp:storageMedium>
  <upnp:album>Video Album</ upnp:album>
  <upnp:genre>Video Genre</ upnp:genre>
  <upnp:channelNr>1</ upnp:channelNr>
  <upnp:channelName>Channel 1</ upnp:channelName>
  <upnp:scheduledStartTime>2004-06-15T01:00:00</ upnp:scheduledStartTime>
  <upnp:scheduledEndTime>2004-06-15T01:01:00</ upnp:scheduledEndTime>
  <upnp:director>Video Director</ upnp:director>
  <upnp:actor>Video Actor</ upnp:actor>
  <dc:description>Program M1</ dc:description>
  <upnp:longDescription>Typical Movie VOB</ upnp:longDescription>
  <res protocolInfo="http-get:*:video / mpeg:" size="33251328" duration="0:01:00" resolution="720x480" dlna:ifoFileURI="http: //
169.254.187.162 / video / M1.IFO" bitrate="532000" CCI=0x01>http: // 169.254.187.162 / video / B-MP2PS_N-MPEG1L2-M1.
mpeg</ res>
</ item>
```

```
<item id="root / video / publicVideo / B-V-MPEG_PS_NTSC-MPEG1L2-M2" parentID="root / video / publicVideo /" restricted="1">
  <dc:title>B-V-MPEG_PS_NTSC-MPEG1L2-M2</dc:title>
  <upnp:class>object.item.videoItem</upnp:class>
  <dc:creator>Video Creator</dc:creator>
  <dc:date>2004-06-15</dc:date>
  <upnp:writeStatus>NOT_WRITABLE</upnp:writeStatus>
  <upnp:storageMedium>HDD</upnp:storageMedium>
  <upnp:album>Video Album</upnp:album>
  <upnp:genre>Video Genre</upnp:genre>
  <upnp:channelNr>2</upnp:channelNr>
  <upnp:channelName>Channel 2</upnp:channelName>
  <upnp:scheduledStartTime>2004-06-15T02:00:00</upnp:scheduledStartTime>
  <upnp:scheduledEndTime>2004-06-15T02:27:27</upnp:scheduledEndTime>
  <upnp:director>Video Director</upnp:director>
  <upnp:actor>Video Actor</upnp:actor>
  <dc:description>Program M2</dc:description>
  <upnp:longDescription>Low bitrate</upnp:longDescription>
  <res protocolInfo="http-get:*:video / mpeg:" size="330237952" duration="0:27:27" resolution="352x240" dlna:ifoFileURI="http: / / 169.254.187.162 / video / M2.IFO" bitrate="195500" CCI=0x02>http: / / 169.254.187.162 / video / B-MP2PS_N-MPEG1L2-M2.mpeg</res>
</item>
```

61

62

| CCI | Value |
|---|---|
| Copy-never | 0x00 |
| Copy-one-generation | 0x01 |
| No-more-copy | 0x02 |
| Copy-free | 0x03 |

61 — `<res protocolInfo="http-get:*:video/mpeg:" size="3302379952" duration="0:27:27" resolution="352x240" dlna:ifoFileURI="http://169.254.187.162/video/M2.IFO" bitrate="195500" CCI=0x02 MediaInfo=0x01>http://169.254.187.162/video/B-MP2PS_N-MPEG1L2-M2.mpeg</res>`

62 — CCI=0x02

63 — MediaInfo=0x01

FIG. 10

| MediaInfo | Value |
|---|---|
| Erasable | 0x00 |
| Non-erasable | 0x01 |
FIG. 11
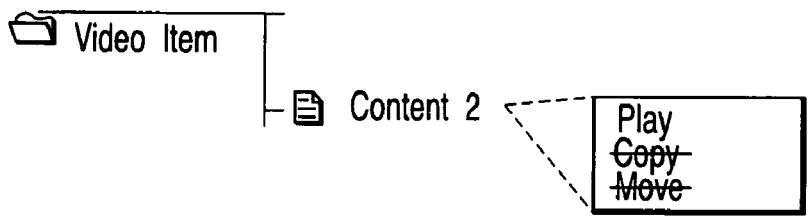
FIG. 12
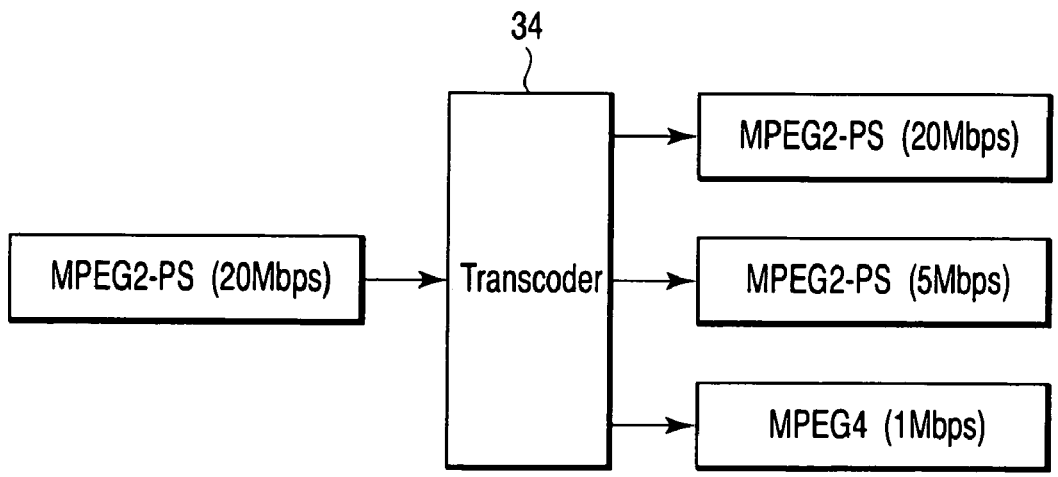
FIG. 13

```
<item id="root / video / publicVideo / B-V-MPEG_PS_NTSC_MPEG1L2-M2" parentID="root / video / publicVideo / " restricted="1">
<dc:title>B-V-MPEG_PS_NTSC_MPEG1L2-M2<dc:title>
...
```

71 )
```
<res protocolInfo="http-get:*:video / mpeg:" size="3302379520" duration="0:27:27" resolution="352x240" dlna:ifoFileURI="http:
//169.254.187.162 / video / M2.IFO" bitrate="20M" CCI=0x01>http: / / 169.254.187.162 / video / B-MP2PS_N-MPEG1L2-M2.mpeg
</res>
```
                                          73    74

81 )
```
<res protocolInfo="http-get:*:video / mpeg:" size="3302379520"duration="0:27:27"resolution="352x240" dlna:ifoFileURI="http: //
169.254.187.162 / video / M2.IFO" bitrate="5M" CCI=0x01>http: / / 169254.187.162 / video / B-MP2PS_N-MPEG1L2-M2.mpeg
</res>
```
                                          83    84

91 )
```
<res protocolInfo="http-get:*:video / mpeg:" size="3302379520" duration="0:27:27" resolution="352x240" dlna:ifoFileURI="http:
//169.254.187.162 / video / M2.IFO" bitrate="1M" CCI=0x01>http: / / 169.254.187.162 / video / B-MP2PS_N-MPEG1L2-M2.mp4
</res>
</item>
```
                                        93    94

F I G. 1 4

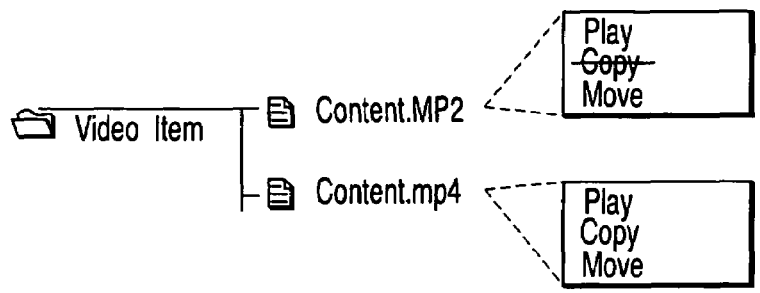
FIG. 15
| CP_CONTENT | ERASABLE_MEDIA | Server operation | Client operation |
|---|---|---|---|
| FALSE | FALSE | Does nothing | Move / Copy / Play permitted |
| TRUE | TRUE | Deleting contents after moving | Move / Play permitted |
| TRUE | FALSE | Does nothing (can do nothing) | Play permitted |
| FALSE | TRUE | Does nothing | Copy / Play permitted |
FIG. 16
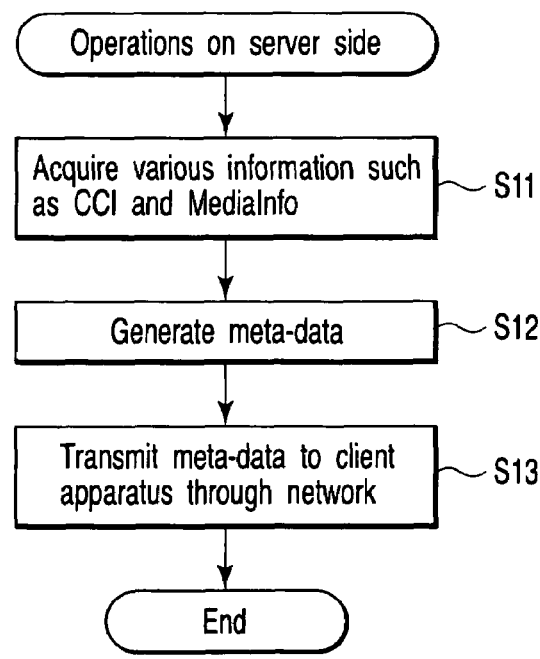
FIG. 17

INFORMATION PROCESSING SYSTEM AND ELECTRONIC APPARATUS

CROSS-REFERENCE TO RELATED APPLICATIONS

This application is based upon and claims the benefit of priority from Japanese Patent Application No. 2005-192693, filed Jun. 30, 2005, the entire contents of which are incorporated herein by reference.

BACKGROUND

1. Field

One embodiment of the invention relates to an information processing system and an electronic apparatus, which receive and transmit meta-data relating to contents through a network.

2. Description of the Related Art

The Digital Transmission Content Protection over Internet Protocol (DTCP-IP) is known as one of the standards to protect copyrights of contents transferred between devices on a network. The DTCP-IP is a standard which can apply a content protecting function provided in a digital interface, such as IEEE 1394, to an IP packet on an IP network. The DTCP-IP uses copy control information (CCI), which indicates whether a copy is allowed or not. Copy control information is utilized in various techniques. For example, Jpn. Pat. Appln. KOKAI Publication No. 2002-319227 discloses a technique for improving the operability on the side of the user by rewriting copy control information.

The Digital Living Network Alliance (DLNA) has been widely noticed as a communication standard, which easily connect devices to each other, for example, in home. The DLNA employs a communication system complying to the Universal Plug and Play specification for Audio Video streaming devices (UPnP-AV). In this system, when a UPnP-AV compliant device is connected to a network, the system automatically recognizes what device is connected. When a user requests connection of the device to another device (target device), information representing a list (menu) of contents (e.g., video and music) stored in the target device is transmitted to the user's device in the form of an XML file. The XML file contains information (URL) representing where the data (such as video) are present. The URL is referred to when contents are played back.

Although the DLNA allows devices to be easily connected to each other, there is no agreement on copyright protection of contents. If high-definition contents, such as digital broadcast programs, are handled in a home network, arrangement to protect contents from unauthorized copying is required. On the part of users, there is a demand for easily obtaining information, from the menu, whether the desired content can be moved, copied or played back.

Although there are techniques of using copy control information as disclosed in the aforementioned publication, it is difficult to satisfy the requirements on the part of users, while maintaining copyright protection on the part of content holders with respect to the contents transferred in compliance with the specification such as the DLNA.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 6 is an exemplary diagram showing an example of description of meta-data representing a content 1;

FIG. 7 is an exemplary diagram showing an example of description of meta-data representing a content 2;

FIG. 10 is an exemplary diagram showing an example of description of meta-data representing the content 2, in which medium type information is described along with CCI;

FIG. 11 is an exemplary diagram showing the relationship between each of two items of information allocated to medium type information and a value thereof;

FIG. 12 is an exemplary diagram showing a display indicating that both "copy" and "move" are inhibited;

FIG. 13 is an exemplary diagram showing an example of separately providing a content in three formats;

FIG. 14 is an exemplary diagram showing an example of describing information on a content of three formats in three "res" areas of one "item";

FIG. 15 is an exemplary diagram showing a display of a permitted (inhibited) process for each of contents of different formats;

FIG. 16 is an exemplary diagram showing operations of the server apparatus and operations of the client apparatus, which are determined in accordance with information indicative of "whether the content is premium or not" and information indicative of "whether the medium is erasable or not";

FIG. 17 is an exemplary flowchart showing basic operations in the server apparatus.

DETAILED DESCRIPTION

Various embodiments according to the invention will be described hereinafter with reference to the accompanying drawings. In general, according to one embodiment of the invention, there is provided an electronic apparatus including a meta-data acquiring portion to acquire, through a network, meta-data containing, in a specific area, copy control information indicative of at least whether copy of a content is permitted or not, a meta-data analyzing portion to analyze information contained in the meta-data acquired by the meta-data acquiring portion, and an information display processing portion to display information indicative of a kind of a process that is permitted to be performed with respect to the content, based on the copy control information contained in the information analyzed by the meta-data analyzing portion, the specific area in the meta-data containing description of attribute information relating to a resource of the content, and the copy control information being described as a part of the attribute information.

Figure 1:
FIG. 1 is an exemplary diagram showing a configuration of an information processing system of the present invention.

FIG. 1 is a diagram showing a configuration of an information processing system of the present invention.

The information processing system includes a server apparatus 11 and at least one client apparatus, which can be connected to each other via a network. The server apparatus 11 represents a home server, which can receive various contents, such as nigh-definition TV broadcast programs by for example, a TV tuner, and records them in a predetermined recording medium. It can also distribute the recorded contents to the client apparatus 12 upon request therefrom. The client apparatus 12 represents a computer or a recording/playing back apparatus, which can obtain a necessary content from the server apparatus 1, and record/play back the content.

In this embodiment, when the server apparatus 11 receives a request for transmitting meta-data (XML file) representing a menu of contents or a content itself from the client apparatus 12, it can transmit the data or the content to the client apparatus 12. The transmission of the meta-data or the like is performed in compliance with the standard of the DLNA (or UPnP-AV). Further, in this embodiment, the copyright protecting function is implemented via techniques, such as copy control information (CCI) in compliance with the standard of the DTCP-IP.

Figure 2:
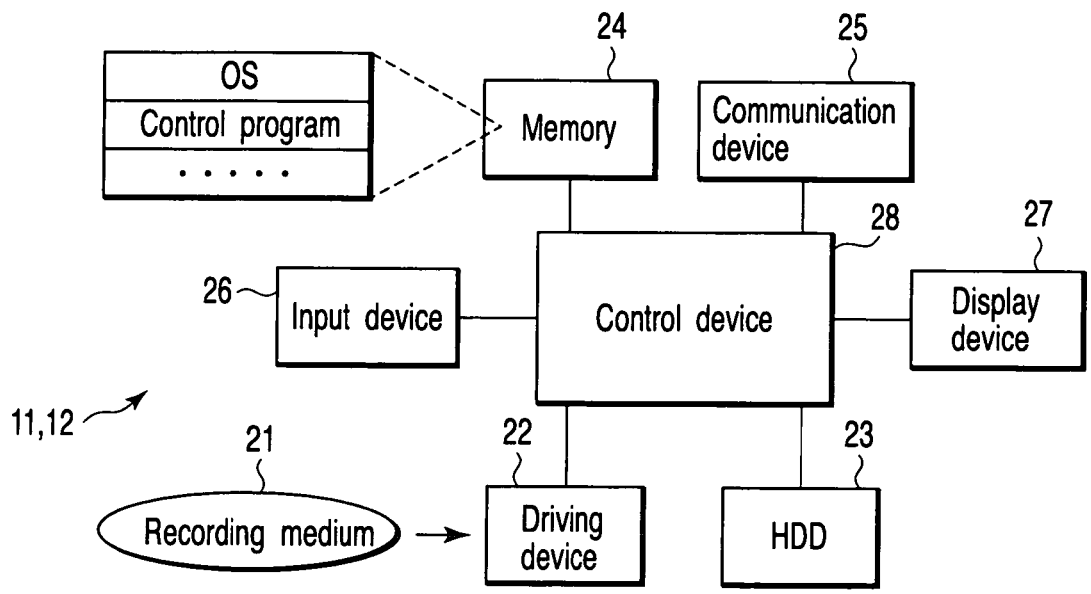
FIG. 2 is an exemplary block diagram showing an outline of structural elements provided in both a server apparatus and a client apparatus.

FIG. 2 is a block diagram showing an outline of structural elements provided in both the server apparatus 11 and the client apparatus 12.

Each of the server apparatus 11 and the client apparatus 12 has, as basic structural elements, a recording medium 21 such as a digital versatile disc (DVD), a driving device 22 to drive the recording medium, a hard disk drive (HDD) 23 to store an OS, a control program, etc., a memory 24, such as a random access memory (RAM) which stores the OS and a control program executed by a control device, a communication device 25 to perform wired or wireless communications with another apparatus, an input device 26 through which the user inputs data, a display device 27 to display various information, and the control device 28, such as a central processing unit (CPU) which controls overall operations of the apparatus.

Rules for transmission of contents in this embodiment will now be described. The DLNA used in this embodiment provides a number of contents transmission methods. In the following, an example will be described, in which the client apparatus 12 downloads a content from the server apparatus 11.

Figure 3:
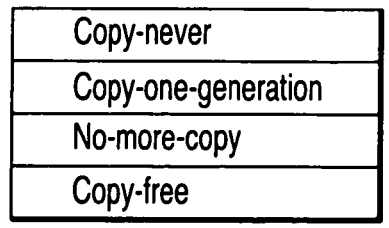
FIG. 3 is an exemplary diagram showing four items of information allocated to CCI.

As represented by a digital broadcast content, some contents are inhibited from digital copy in order to protect the rights of content holders. Such a content is called "a premium content" in this description. According to the specification of DTCP-IP used in this embodiment, to transmit a premium content, CCI need be transmitted along with the content itself. As shown in FIG. 3, the following four items are defined as CCI.

Copy-never (copy is inhibited)
Copy-one-generation (copy for one generation is permitted)
No-more-copy (no more copy is permitted)
Copy-free (copy is permitted)

Details of processes to be performed in accordance with the items "Copy-one-generation" and "No-more-copy" will be described below.

"Copy-one-generation" means that copy for one generation is permitted. In other words, the content transmitted along with this item of CCI can be copied; however, after the copy, CCI of both the original content and the copied content must be changed to "No-more-copy".

"No-more-copy" means that no more copy is permitted. The content transmitted along with this item of CCI cannot be copied, but can be moved. When the content is moved, the original content must be deleted or changed to a playback-disabled or inaccessible condition.

When a content is transmitted in compliance with the DTCP-IP on the DLNA, it is necessary to conform to the above rules.

Procedures for transmitting a content based on the DLNA will now be described.

According to the DLNA, the client apparatus 12 acquires a content from the server apparatus 11 in the following steps:

1. The client apparatus acquires a device description of the server apparatus.
2. The client apparatus acquires a service description of the server apparatus.
3. The client apparatus acquires content information (meta-data) of the server apparatus.
4. The client apparatus selects a desired content and requests start of transmission of the content.
5. The transmission of the content is completed.

In this description, it is assumed that the aforementioned premium content is transmitted. As described above, the CCI of the premium content is required to indicate how the content should be processed. Therefore, unless the CCI is embedded in any of the data transmitted along with the content in compliance with the DLNA, the user cannot judge, for example, whether the content can be copied or must be moved.

To solve this problem, in this embodiment, it is proposed to embed CCI in the meta-data transmitted in the third step of the above five steps. More specifically, it is proposed to set the CCI as a part of the attribute in a "res" field, in which attribute information on the resource associated with each content is described, so that the client can be notified of the CCI more flexibly.

Figure 4:
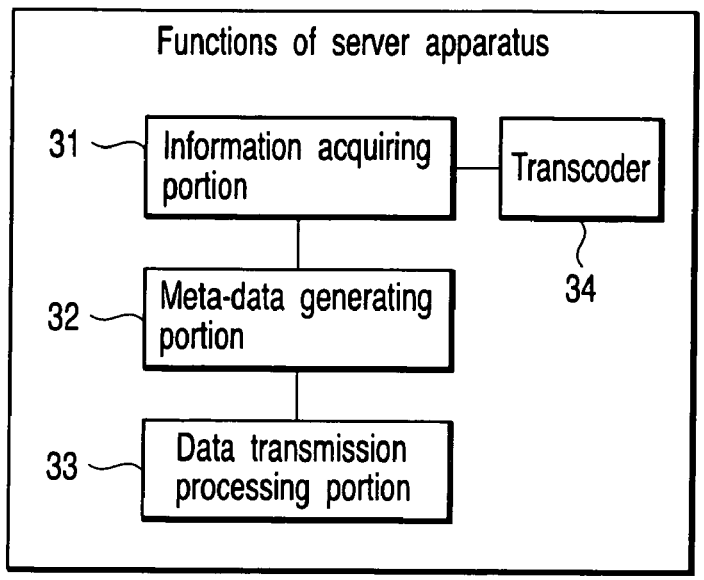
FIG. 4 is an exemplary block diagram showing an outline of a function configuration of the server apparatus.

FIG. 4 is a block diagram showing an outline of a function configuration of the server apparatus 11.

The functions of the server apparatus 11 are implemented via the control program executed by, for example, the control device 28 shown in FIG. 2. The functions include an information acquiring portion 31, a meta-data generating portion 32, a data transmission processing portion 33 and a transcoder 34.

The information acquiring portion 31 has a function of acquiring CCI and medium type information (information indicative of whether the medium storing the content is erasable or not) described above, from an information storage area managed under the OS.

The meta-data generating portion 32 has a function of generating meta-data, in which the CCI and the medium type information acquired by the information acquiring portion 31 are described as an attribute in the "res" area.

The data transmission processing portion 33 has a function of transmitting the meta-data generated by the meta-data generating portion 32 to the network. The data transmission processing portion 33 also has a function of moving a content to the client apparatus 12. This function is implemented by erasing the original content or managing the content as having been checked out from the server apparatus 11 under the control of a mechanism of managing the check in/check out of contents with respect to the server apparatus 11.

The transcoder 34 has a function of converting one content to contents of different qualities by executing different transcode processes. When the transcoder 34 is used, the meta-data generating portion 32 generates meta-data, in which information indicative of permission of copy for one generation is described in the "res" area, with respect to a content whose quality is lowered under the predetermined reference value by a transcode process, even if the acquired CCI indicates that no more copy is permitted.

Figure 5:
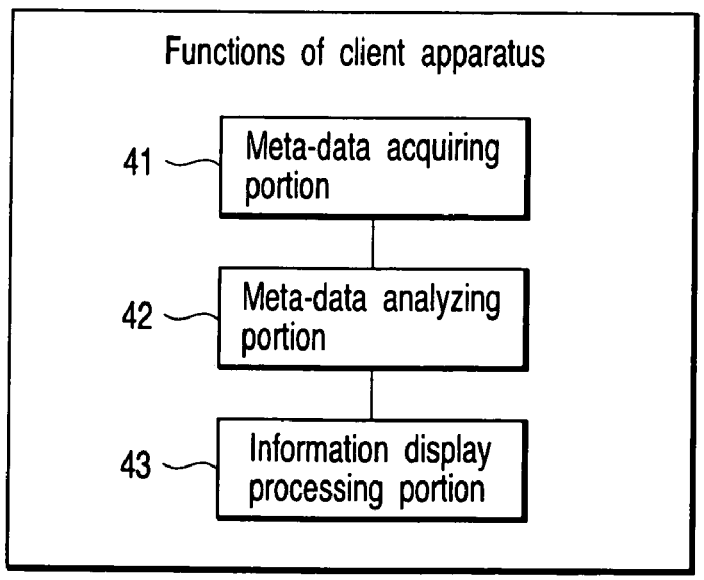
FIG. 5 is an exemplary block diagram showing an outline of a function configuration of the client apparatus.

FIG. 5 is a block diagram showing an outline of a function configuration of the client apparatus 12.

The functions of the client apparatus 12 are implemented via the control program executed by, for example, the control device 28 shown in FIG. 2. The functions include a meta-data acquiring portion 41, a mata-data analyzing portion 42 and an information display processing portion 43.

The meta-data acquiring portion 41 has a function of acquiring, through the network, meta-data in which CCI and medium type information are described as an attribute in the "res" area.

The mata-data analyzing portion 42 has a function of analyzing information contained in the meta-data acquired by the meta-data acquiring portion 41.

The information display processing portion 43 has a function of displaying information indicative of the kind of a process that can be performed with respect to the content, based on the CCI and medium type information contained in the information analyzed by the meta-data analyzing portion 42.

FIGS. 6 and 7 show examples of description of meta-data of contents. FIG. 6 is a diagram showing an example of description of meta-data representing a content 1, and FIG. 7 is a diagram showing an example of description of meta-data representing a content 2. In FIGS. 6 and 7, the numerals 51 and 61 denote "res" areas, and the numerals 52 and 56 denote the values of CCI as attributes in the "res" area.

The general system of description of meta-data is determined by the UPnP-AV. The system used in this embodiment is an extension of the general system. The values of the CCI in FIGS. 6 and 7 are determined on the basis of the correspondence table of FIG. 8. Specifically, the value representing "Copy-never" is defined as "0x00", "Copy-one-generation" as "0x01", "No-more-copy" as "0x02", and "Copy-free" as "0x03".

Thus, the client apparatus 12, which has obtained the meta-data, can recognize that the CCI of the content 1 is "Copy-one-generation", and the CCI of the content 2 is "No-more-copy".

Figures 8, 9:
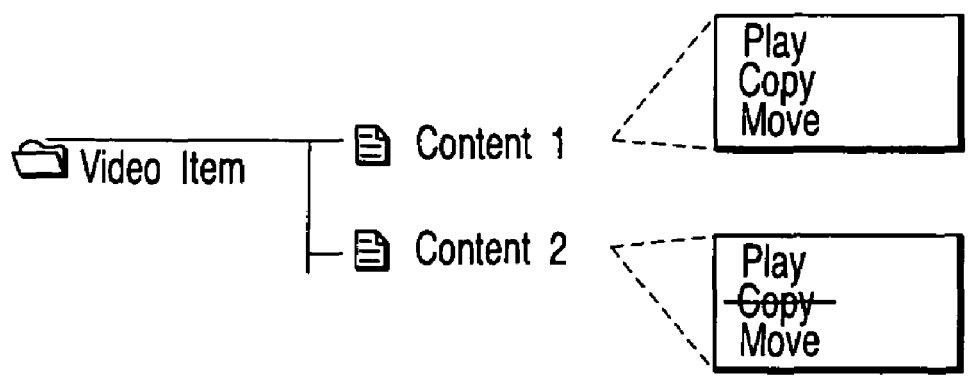
FIG. 8 is an exemplary diagram showing the relationship between each of four items of information allocated to CCI and a value thereof.
FIG. 9 is an exemplary diagram showing an example of a menu displayed in the client apparatus.

Therefore, it is possible to prepare a user menu in advance such that the copy command cannot be executed for the content 2. FIG. 9 shows an example of a menu displayed in the client apparatus 12. As shown in FIG. 9, the client apparatus 12 displays information indicating that "playback", "copy" and "move" are permitted for the content 1, while "playback" and "move" are permitted but "copy" is inhibited for the content 2.

Next, an example will be described, in which the medium type information of the medium storing the content is described as an attribute of the "res" area in the meta-data in the same manner as described above.

In this example, the message that "the content cannot be erased or moved but can be played back" can be transmitted from the server apparatus 11 to the client apparatus 12.

FIG. 10 shows an example of description of meta-data representing the content 2, in which medium type information is described along with CCI. The numeral 63 denotes medium type information "MediaInfo" as an attribute of the "res" area.

The values of the medium type information in FIG. 10 are determined on the basis of the correspondence table of FIG. 11. Specifically, the value representing "Erasable" is defined as "0x00", and "Non-erasable" as "0x01".

Thus, the client apparatus 12, which has obtained the meta-data as shown in FIG. 10, can recognize that the CCI of the content 2 is "No-more-copy", and the medium type information "MediaInfo" is "non-erasable"; that is, the operation "move" cannot be executed for the content 2. Therefore, the client apparatus 12 can realize more satisfactory operations as a system, because it can prepare a user menu as shown in FIG. 12, indicating that not only the operation "copy" but also the operation "move" cannot be executed, by referring to the medium type information "MediaInfo" as well as the CCI.

A case will now be described, in which the server apparatus 1 has a transcode function, and provides one content in a plurality of formats. For example, it is assumed the server apparatus 11 separately provides a content in MPEG2-PS (20 Mbps) format divided into three formats. More specifically, the transcoder 34 provided in the server apparatus 11 can output the content in the MPEG-2 PS (20 Mbps) format of high definition as it is. It can also output it in the MPEG2-PS (5 Mbps) format of slightly lower definition, or in the MPEG4 (1 Mbps) format of low definition.

Since the MPEG4 (1 Mbps) format image is considerably degraded as compared to the original content, copy of a premium content that is defined as "No-more-copy" may be permitted. In this case, the content in the MPEG4 (1 Mbps) format of the low definition is moved, thereby preventing the original premium content from being erased from the server.

FIG. 14 shows an example of describing information on the content of the three formats in three "res" areas of one "item".

AS shown in FIG. 14, information 73 indicative of the bit rate value describes "20M", and information 74 indicative of the value of CCI describes "CCI=0x01". In the "res" area denoted by the numeral 81, information 83 indicative of the bit rate value describes "5M", and information 84 indicative of the value of CCI describes "CCI=0x01". Likewise, in the "res" area denoted by the numeral 91, information 93 indicative of the bit rate value describes "1M", and information 94 indicative of the value of CCI describes "CCI=0x01". Each "res" area may additionally describe information indicative of the format type (e.g., MPEG-2 PS and MPEG4).

Therefore, the client apparatus 12 can display a permitted (or inhibited) operation for each of contents of different formats, for example, as shown in FIG. 15.

FIG. 16 is a diagram showing operations of the server apparatus 11 and operations of the client apparatus 12, which are determined in accordance with information indicative of "whether the content is premium or not" and information indicative of "whether the medium is erasable or not".

In FIG. 16, a premium content is represented as "CP_CONTENT" and an erasable medium is represented as "ERASABLE_MEDIA". Since the information indicative of "whether the content is premium or not" can be represented as a binary value, it is considered simplified information of the aforementioned CCI of a quaternary value. Such information may be described in the "res" area of the meta-data instead of the CCI.

The correspondence table shown in FIG. 16 means the following.

If the subject content is not a premium content and the medium storing the same is not an erasable medium, operations "move", "copy" and "play" with respect the content are permitted in the client apparatus 12 (if any of these operations is performed, the server apparatus 11 does nothing to the content).

If the subject content is a premium content and the medium storing the same is an erasable medium, an operation "copy" is not permitted and operations "move" and "play" are permitted in the client apparatus 12 (if the operation "move" is performed, the server apparatus 11 deletes the original content).

If the subject content is a premium content and the medium storing the same is not an erasable medium, only an operation "play" is permitted in the client apparatus 12 (if any operation is performed, the server apparatus 11 does nothing (can do nothing) to the content).

If the subject content is not a premium content and the medium storing the same is an erasable medium, an operation "move" is not permitted and operations "copy" and "play" are permitted in the client apparatus 12 (if any of these operations is performed, the server apparatus 11 does nothing to the content).

Basic operations in the server apparatus 11 will now be described with reference to FIG. 17.

When the server apparatus 11 acquires CCI and medium type information relating to the content in reply to the request from the client apparatus 12 (block S11), it generates meta-data describing the CCI and medium type information as an attribute in the "res" area (block S12). Then, the server apparatus 11 transmits the meta-data to the client apparatus 12 through the network (block S13).

Figure 18:
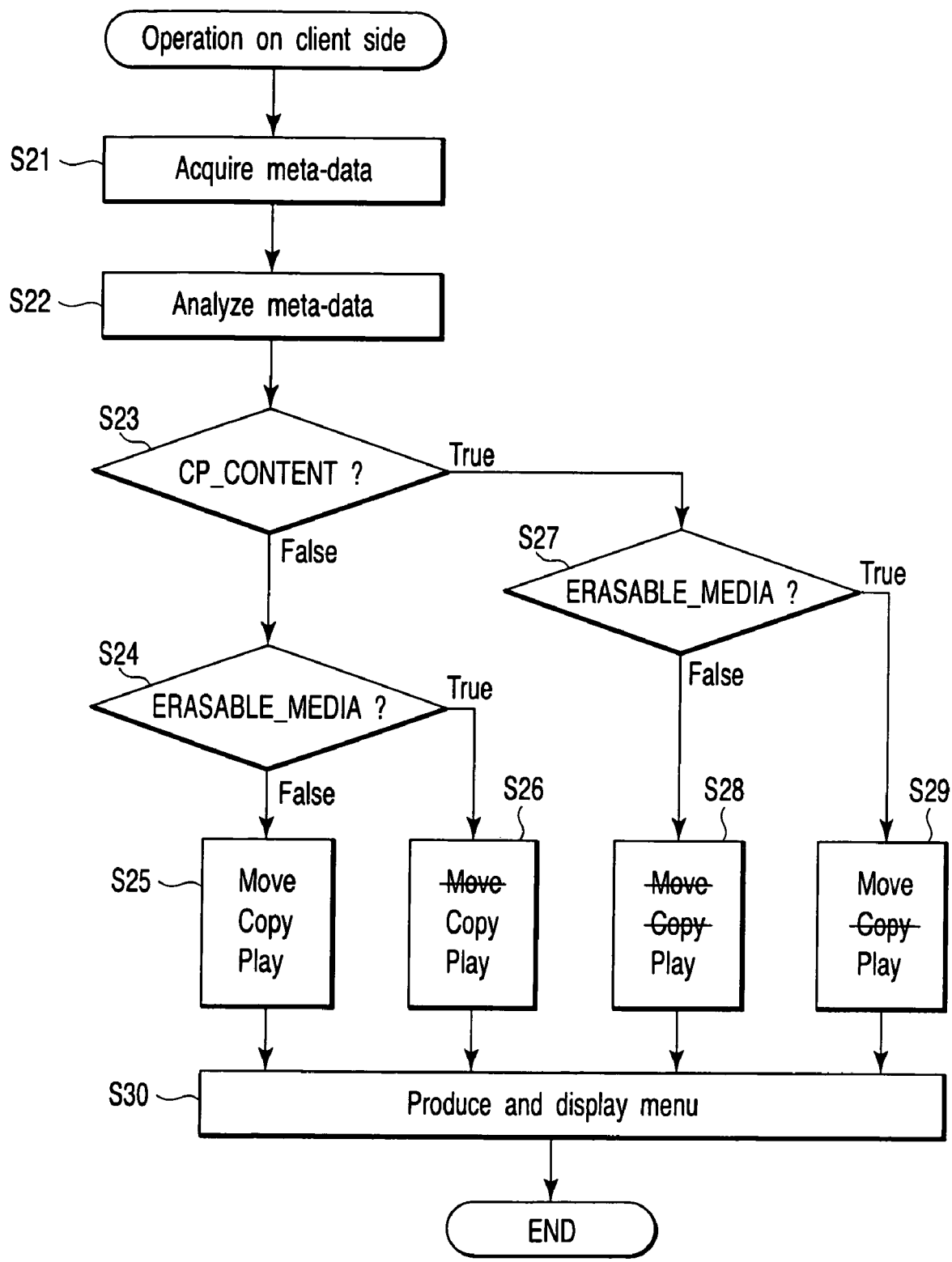
FIG. 18 is an exemplary flowchart showing basic operations in the client apparatus.

Next, basic operations in the client apparatus 12 will be described with reference to FIG. 18.

When the client apparatus 12 acquires the meta-data transmitted from the server apparatus 12 through the network (block S21), it analyzes the information contained in the meta-data (block S22).

The client apparatus 12 determines the kind of an operation that can be preformed with respect to the content based on the CCI and medium type information contained in the result of the analysis (blocks S23 to S29).

For example, if the subject content is not a premium content (False in block S23) and the medium storing the same is not an erasable medium (False in block S24), the client apparatus 12 determines that operations "move", "copy" and "play" with respect to the content are permitted (block S25).

If the subject content is not a premium content (False in block S23) and the medium storing the same is an erasable medium (True in block S24), the client apparatus 12 determines that an operation "move" is not permitted and operations "copy" and "play" are permitted (block S26).

If the subject content is a premium content (True in block S23) and the medium storing the same is an erasable medium (False in block 27), the client apparatus 12 determines that only an operation "play" is permitted (block S28).

If the subject content is a premium content (True in block S23) and the medium storing the same is an erasable medium (True in block S27), the client apparatus 12 determines that an operation "copy" is not permitted and operations "move" and "play" are permitted (block S29).

The client apparatus 12 produces and displays a menu based on the above determination results (block S30).

As described above, according to the embodiment of the present invention, the client apparatus 12 determines the kinds of operations that are permitted for the content, based on the CCI (or information indicative of whether the content is a premium content or not) and medium type information described in the "res" area of the meta-data generated by the server apparatus 11. Then, the client apparatus 12 can display an appropriate menu showing the operations. Therefore, the user can easily recognize the types of operations that are permitted for the content. In addition, since premium contents can be handled more flexibly, the operability on the side of the user can be improved, while the benefits on the side of the content holders are protected.

As has been detailed above, it is possible to efficiently improve the convenience of users, while maintaining protection of the copyrights of contents.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing system, comprising:
 a first electronic apparatus; and
 a second electronic apparatus connectable to the first electronic apparatus through a network, the first electronic apparatus including:
 a control device;
 an information acquiring portion to acquire copy control information indicative of at least whether copy of a content is permitted or not;
 a meta-data generating portion to generate meta-data containing in a specific area the copy control information acquired by the information acquiring portion;
 a data transmission processing portion to transmit the meta-data generated by the meta-data generating portion to the network; and
 a transcode processing portion capable of converting one content to contents of different qualities by executing different transcode processes,
 the meta-data generating portion generating the meta-data containing, in the specific area, information indicative of permission of copy for one generation, with respect to a content whose quality is lowered under a predetermined reference value by a transcode process, even if the copy control information indicates that no more copy is permitted,
 the second electronic apparatus including:
 a meta-data acquiring portion to acquire the meta-data transmitted to the network;
 a meta-data analyzing portion to analyze information contained in the meta-data acquired by the meta-data acquiring portion; and
 an information display processing portion to display information indicative of a kind of a process that is permitted to be performed with respect to the content, based on the copy control information contained in the information analyzed by the meta-data analyzing portion,
 the specific area in the meta-data containing description of attribute information relating to a resource of the content, and the copy control information being described as a part of the attribute information.

2. The information processing system according to claim 1, wherein:
 the meta-data generating portion generates the meta-data further containing, in the specific area, medium type information indicative of whether a medium storing the content is erasable or not; and
 the information display processing portion displays the information indicative of the kind of the process that is permitted to be performed with respect to the content, further based on the medium type information contained in the information analyzed by the meta-data analyzing portion.

3. The information processing system according to claim 1, wherein when the content is moved from the first electronic apparatus to the second electronic apparatus, the data transmission processing portion moves the content by erasing the content or managing the content as having been checked out from the first electronic apparatus.

4. An electronic apparatus including a control device, comprising:
   an information acquiring portion to acquire copy control information indicative of at least whether copy of a content is permitted or not;
   a meta-data generating portion to generate meta-data containing, in a specific area, the copy control information acquired by the information acquiring portion;
   a data transmission processing portion to transmit the meta-data generated by the meta-data generating portion to network; and
   a transcode processing portion capable of converting one content to contents of different qualities by executing different transcode processes,
   the meta-data generating portion generating the meta-data containing, in the specific area, information indicative of permission of copy for one generation, with respect to a content whose quality is lowered under a predetermined reference value by a transcode process, even if the copy control information indicates that no more copy is permitted, and
   the specific area in the meta-data containing description of attribute information relating to a resource of the content, and the copy control information being described as a part of the attribute information.

5. The electronic apparatus according to claim 4, wherein:
   the meta-data generating portion generates the meta-data further containing, in the specific area, medium type information indicative of whether a medium storing the content is erasable or not.

6. The electronic apparatus according to claim 4, wherein when the content is moved from the electronic apparatus to another apparatus, the data transmission processing portion moves the content by erasing the content or managing the content as having been checked out from the electronic apparatus.

7. An electronic apparatus including a control device, comprising:
   a meta-data acquiring portion to acquire, through a network, meta-data containing, in a specific area, copy control information indicative of at least whether copy of a content is permitted or not;
   a meta-data analyzing portion to analyze information contained in the meta-data acquired by the meta-data acquiring portion; and
   an information display processing portion to display information indicative of a kind of a process that is permitted to be performed with respect to the content, based on the copy control information contained in the information analyzed by the meta-data analyzing portion,
   the meta-data acquiring portion acquiring the meta-data containing, in the specific area, information indicative of permission of copy for one generation, with respect to a content whose quality is lowered under a predetermined reference value by a transcode process, even if the copy control information indicates that no more copy is permitted, and
   the specific area in the meta-data containing description of attribute information relating to a resource of the content, and the copy control information being described as a part of the attribute information.

8. The electronic apparatus according to claim 7, wherein:
   the specific area in the meta data further contains medium type information indicative of whether a medium storing the content is erasable or not; and
   the information display processing portion displays the information indicative of the kind of the process that is permitted to be performed with respect to the content, further based on the medium type information contained in the information analyzed by the meta-data analyzing portion.

* * * * *